(12) United States Patent
Ohki

(10) Patent No.: US 6,310,865 B1
(45) Date of Patent: Oct. 30, 2001

(54) HIGH-SPEED WIRELESS ACCESS DEVICE

(75) Inventor: Masahiro Ohki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/100,399

(22) Filed: Jun. 19, 1998

(30) Foreign Application Priority Data

Jun. 20, 1997 (JP) .................................................. 9-164146

(51) Int. Cl.$^7$ ...................................................... H04Q 7/20
(52) U.S. Cl. ............................................ 370/311; 370/349
(58) Field of Search .................................... 370/280, 311, 370/345, 349, 465; 375/222, 229, 230

(56) References Cited

FOREIGN PATENT DOCUMENTS

| | | |
|---|---|---|
| 2-5633 | 1/1990 | (JP) . |
| 3-77635 * | 4/1991 | (JP) . |
| 7-38487 | 2/1995 | (JP) . |
| 9-130313 | 5/1997 | (JP) . |
| 9-252320 | 9/1997 | (JP) . |
| 10-164157 | 6/1998 | (JP) . |

OTHER PUBLICATIONS

Japanese Office Action, dated Sep. 14, 1999, with English language translation of Japanese Examiner's comments, for Japanese Application 9–164146.

* cited by examiner

*Primary Examiner*—Melvin Marcelo
(74) *Attorney, Agent, or Firm*—McGuireWoods LLP

(57) ABSTRACT

A high-speed wireless access device including wireless modems of a base station and a mobile terminal is disclosed. The wireless modem of the base station has a component to add a low-speed packet to the beginning of a high-speed packet, a component to add information to the low-speed packet, and a component to transmit a packet to a mobile terminal by switching to high-speed mode immediately after addition of the low-speed packet. The wireless modem of the mobile terminal has a component for switching from a low-speed demodulation to a high-speed modulation/demodulation with an equalizer built-in, a component for analyzing data received by the low-speed demodulation, a component for turning off the low-speed demodulation and for turning on the high-speed modulation/demodulation when recognizing a packet to the mobile terminal, a component for turning off the high-speed modulation/demodulation after receiving the packet at the mobile terminal, a component for holding an AGC information in a low-speed receiving mode and for making use of this information in a high-speed receiving mode, and a component for holding a timing extraction information in the low-speed receiving mode and for making use of this information in the high-speed receiving mode.

11 Claims, 17 Drawing Sheets

HIGH-SPEED WIRELESS ACCESS DEVICE

BACKGROUND OF THE INVENTION

1. Field of the Invention

The present invention relates to a high-speed wireless access device, in particular, to a high-speed wireless access device, which reduces power consumption during the stand-by mode of wireless modems in a terminal in a wireless asynchronous transfer mode (ATM).

2. Description of the Related Art

There are several access systems like that illustrated in FIG. 9 in which wireless terminal access to a hard-wired LAN or public phone network via base stations(BS). Typical TDMA(Time Division Multiple Access)/TDD(Time Division Duplex) systems thereof are exemplified by the configuration illustrated in FIG. 10 and a corresponding distributed system in FIG. 11. In a TDMA/TDD system as exemplified by FIG. 10, every mobile terminal (MT) performs timing synchronization by using a preamble signal at the beginning of a frame added by a base station. Then a mobile terminal determines whether or not a packet addressed to that particular mobile terminal exists by checking a control packet following the preamble signal. If the packet signal to such a mobile terminal exists, this packet signal is loaded from any one of the packets (P1 . . . Pk) following a control packet. In corresponding distributed systems exemplified by FIG. 12 also signal data is loaded after determining that a received packet is addressed to a mobile terminal. However, there is a difference between the two systems, namely, a TDMA/TDD system requires for only one preamble signal to be added to the beginning of a downlink frame from a base station, while corresponding distributed systems should add respective preamble signals to the beginning of each of packets from and to a mobile terminal. Accordingly, although corresponding distributed systems allow an "ad hoc" communication between mobile terminals, effective data transmission throughput may be decreased depending on data length.

When multimedia services including such image signals as MPEG2 images are provided by access systems such as those as mentioned above, the data transmission rate in a wireless section should be not less than 20 M bps. This is due to existing overheads in regard to preamble signals and the transmission rights control. In addition, if mobile operations are to be considered, wireless transmission systems should allow high-speed multimedia transmission under a multipath fading condition. Accordingly, there are devised systems which prohibit receiving of long-delayed multipath signals by using sharp directional antennas, or equalizing systems which remove an intercede interference by multipath. Sharp directional antennas have an overwhelming advantage for communication between fixed stations, but if any one of the stations is a mobile terminal, complicated and troublesome antenna control is required, hence equalizing systems are currently considered to be advantageous. An appropriate equalizing system against multipath fading may be a system which uses a decision feedback equalizer (DFE) as a on-linear equalizer or a maximum likelihood system estimation type of equalizer, or their combination. However, each system has disadvantages of requiring large-scaled circuits and much power consumption. For example, under some conditions with a delay spread indicating a spreading state of multipath about 20 ns maximum, if high-speed transmission with a symbol rate of 25M symbols/sec is performed, an equalizer should have not less than 10 taps, which results in a large-scaled circuit.

FIG. 8 illustrates a block diagram of a DFE as an example equalizer. Further, FIG. 13 illustrates an example of the structure of a preamble when using an equalizer. In FIG. 8, reference numeral 301 denotes a feed-forward type filter. Similarly, 302 denoting a feedback filter, 303 denoting a discriminator, 304 denoting a parameter estimator, and 305 and 306 denoting adders. Further in FIG. 13, there are four preamble signals, namely preamble signal 211 for automatic gain controller (AGC), preamble signal 212 for phase synchronization, preamble signal 213 for timing extraction, and preamble signal 214 for tap coefficient setting. Reference numeral 215 denotes a unique word (UW) in order to identify the beginning of data, and reference numeral 220 denotes data item.

In FIG. 8, feedback filter 302 is operated according to a symbol rate. If, however, feed-forward filter 302 is also operated at such symbol rate, there may be occurred aliases, which cause intercode interference against adjacent symbols of both sides. In this case, intercede interference to such adjacent symbols should be excluded through precise timing extraction by using preamble signal 213 for timing extraction as shown in FIG. 13. However, since receiving signals are significantly distorted under multipath fading conditions, it is difficult to carry out precise timing extraction. In this connection, modems for hard-wired low-speed data communication commonly use a method for avoiding aliases in which a sampling is performed at a frequency double of a symbol rate ("double frequency sampling"). Samplings may be carried out at the same frequency as that of a symbol rate. In such a case it is sufficient to use half the number of taps of feed-forward filter 301 as compared with the double frequency sampling, thereby allowing circuit size to be minimized. However, sampling at the same frequency as the symbol rate as described above requires preamble signal 213 for timing extraction, and time of existence of such a preamble signal 213 correspondingly shortens data transmission rates, which results in less-effective data transmission throughput.

On the other hand, when sampling at a frequency double of a symbol rate is carried out, advantageously effective data transmission may be obtained, since preamble 213, for timing extraction, is no longer required. However, large-scaled circuits should be prepared for feed-forward filter 301, and much power consumption is still required in order to activate feed-forward filter 301 at a double clock frequency (for present example, for instance, at 50 MHz). As discussed above, an equalizer for high-speed transmission has disadvantages of large-scaled circuits and much power consumption. Accordingly, either the TDMA/TDD system or corresponding distributed system consumes much electric power it the equalizer is operated throughout the stand-by mode, and such a system is not suitable for wireless multimedia access services on the assumption that terminals are powered by battery. In addition, when an equalizer is used, preamble 214, for tap coefficient setting, should be included in addition to preamble 211 for AGC, 212 for phase synchronization and 213 for timing extraction (as described above), thereby preamble length may become longer than that of a low-speed wireless modem. Accordingly, depending on the value of data length 220, there may be a case that the data transmission becomes significantly less effective and only lower speed data service can be provided.

Wireless modems used for high-speed wireless access systems should satisfy two requirements, namely, providing lower power consumption and securing effective data transmission throughput. Therefore, in regard to wireless modems suitable for high-speed wireless transmission and consideration of mobile operation, there should be provided a means of low-speed demodulation to reduce power consumption during the stand-by mode, as well as high-speed modulation/demodulation including an equalizer to assist operability against multipath fading conditions.

The Japanese Patent Laid-Open Publication No. Hei 2-5633 discloses a means for reducing power consumption as illustrated herein in FIGS. 14, 15 and 16. Shown in FIG. 14 is a block diagram of a receiver, and in FIGS. 15 and 16 structures of frames. The receiver has a low-speed clock generator 91 and a high-speed clock generator 92, by which calling words are received at a low-speed clock during the stand-by mode. FIG. 15 shows a state, in which a call group that such station is belonging to is received; a message is received by changing clock rate from the lower one to the higher one. FIG. 16 shows a state that, in addition to a call group that such station is belonging to, the clock is switched to high-speed to receive the message if the call word includes a call sign addressed to such station. In such described arrangement, power consumption during the stand-by mode may be decreased.

However, in regard to the means disclosed in Japanese Patent Laid-Open Publication No. Hei 2-5633, when a packet addressed to that station is received, there is provided only a means of switching to a high-speed clock in order to decode the error correction encoded high-speed data. Inter-code interference due to multipath fading cannot be removed only by an error correction function, thus high-speed wireless access is hard to accomplish. Thus, it is necessary, as described above, to reinforce operability against multipath fading conditions by using for example an equalizing system and so forth, under such multipath fading conditions.

Therefore, a wireless modem should be provided with a means for reducing power consumption during stand-by mode by using low-speed demodulation as well as a built-in equalizer for high-speed modulation/demodulation. A corresponding frame format is that as illustrated in FIG. 17, in which a low-speed packet 100 is added to the beginning of high-speed packet 200. FIG. 13 illustrates the structure of the high-speed packet 200, comprising high-speed preamble signal 210 and data section 220, and FIG. 7 illustrates the structure of a low-speed packet 100. When comparing a frame format such as that illustrated in FIG. 17 with that of FIG. 16, it is clear that the frame format illustrated in FIG. 17 should include a high-speed preamble signal 210 as well as a low-speed mode preamble signal 110, thus effective throughput becomes decreased. In this connection, a TDMA/TDD method such as that shown in FIG. 1 may offer better throughput since it is sufficient to respectively add a low-speed control packet and a low-speed-mode preamble to the beginning of a downlink frame. However, access by a corresponding distribution system, such as that illustrated in FIG. 12, used for example in a wireless LAN operating in the 2.4 GHz frequency band, may cause effective throughput to become significantly decreased depending on the length of high-speed data.

SUMMARY OF THE INVENTION

Accordingly, it is an object of the present invention to provide a wireless modem, which reduces power consumption during stand-by mode, maintains excellent system-wide throughput, and enables the circuit size to be minimized in an equalizer, for a high-speed wireless multimedia access system adopting either a centralized TDMA/TDD access system or a corresponding distributed system.

To achieve the object as mentioned above, according to the present invention, there is provided a high-speed wireless access device comprising a wireless modem of a base station and a wireless modem of a mobile terminal.

The wireless modem for base stations includes a means of low-speed modulation and a high-speed modulation/demodulation with a built-in equalizer for adding low-speed packet transmitted by low-speed modulation to the beginning of high-speed packet, a means for adding information to a low-speed packet such that a terminal may be determined to which terminal a packet is transmitted, and a means for transmitting such a packet addressed to a mobile terminal by switching to high-speed mode immediately after addition of a low-speed packet.

Further, the wireless modem for mobile terminals includes a low-speed demodulation, a high-speed modulation/demodulation means with a built-in equalizer, a means for switching from low-speed demodulation to high-speed modulation/demodulation and vice-versa, a means for analyzing data received by low-speed demodulation, a means for turning low-speed demodulation off and for turning high-speed modulation/demodulation on when a packet addressed to a mobile terminal is recognized, a means for turning the high-speed modulation/demodulation off after receiving the packet addressed to a mobile terminal, a means for holding automatic gain control (AGC) information in low-speed receiving mode and for using such AGC information in high-speed receiving mode, and a means for holding timing extraction information in low-speed receiving mode and for making use of the timing information in the high-speed receiving mode.

Preferably, the means for holding timing extraction information should include a means of timing extraction.

Preferably, the timing extraction means should use a sampling rate, which is the range of 4 to 16 times (most preferably 8 times) higher than the low bit-rate.

Preferably, a built-in equalizer within the high-speed modulation/demodulation means of a wireless modem for mobile terminals should be a decision feedback equalizer.

With this structure, a low-speed packet can be added to the beginning of a high-speed packet, and AGC as well as timing information, which have been set in a low-speed packet, can be used without any modification in a high-speed packet, thus power consumption during stand-by mode is decreased, ineffective data transmission is prohibited, and minimum scaling and minimum power consumption of said equalizer are accomplished.

BRIEF DESCRIPTION OF THE DRAWINGS

The above and further objects, novel features and advantages of the present invention will more fully become obvious upon an understanding of the following detailed description taken in connection with the accompanying drawings, in which.

Figure 6:
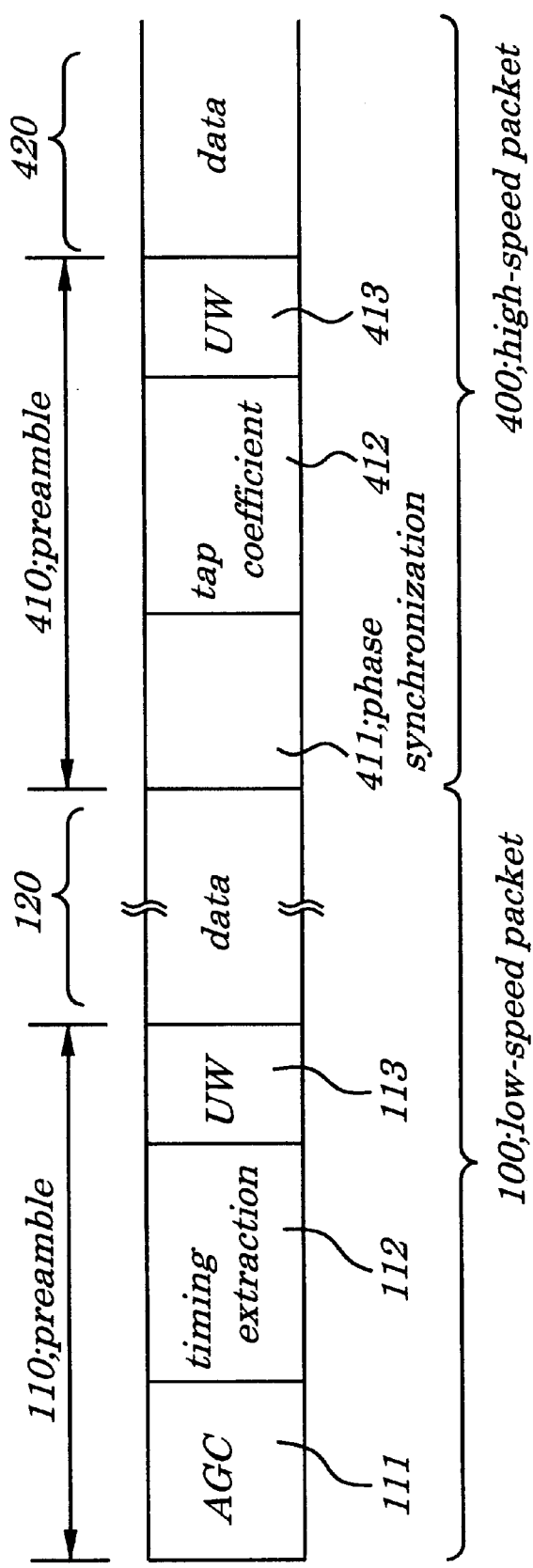
Figure 7:
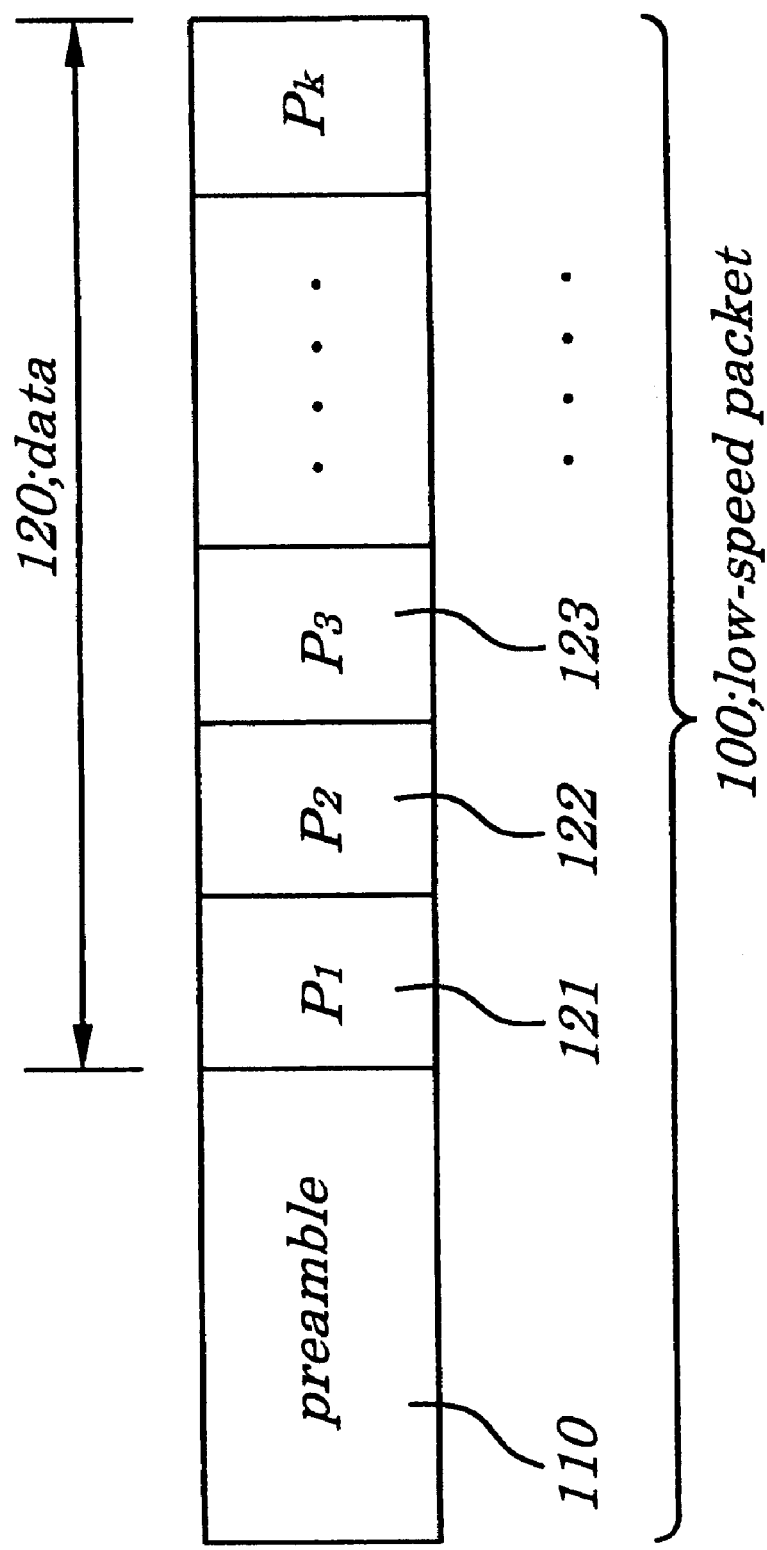
Figure 8:
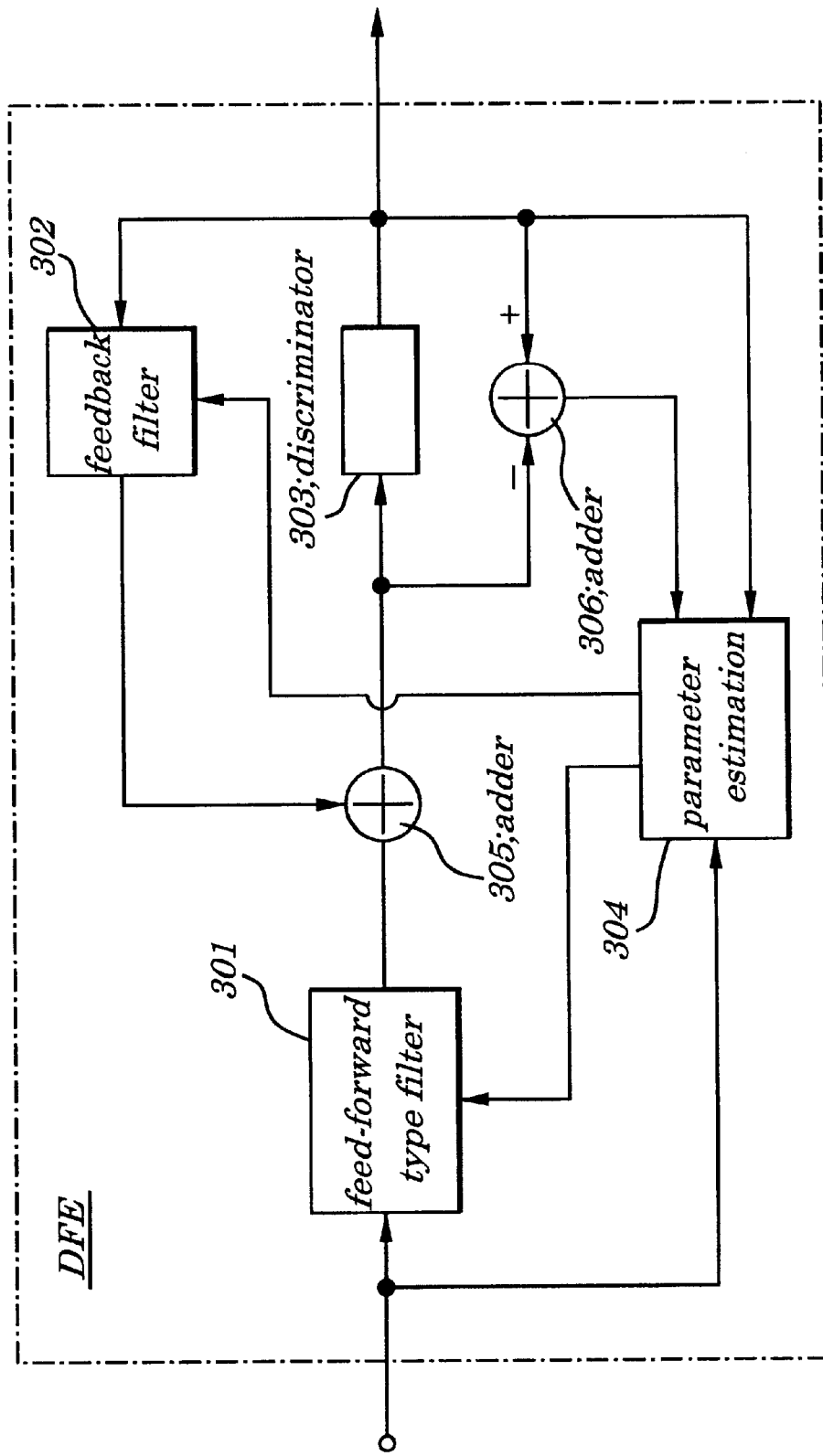
Figure 9:
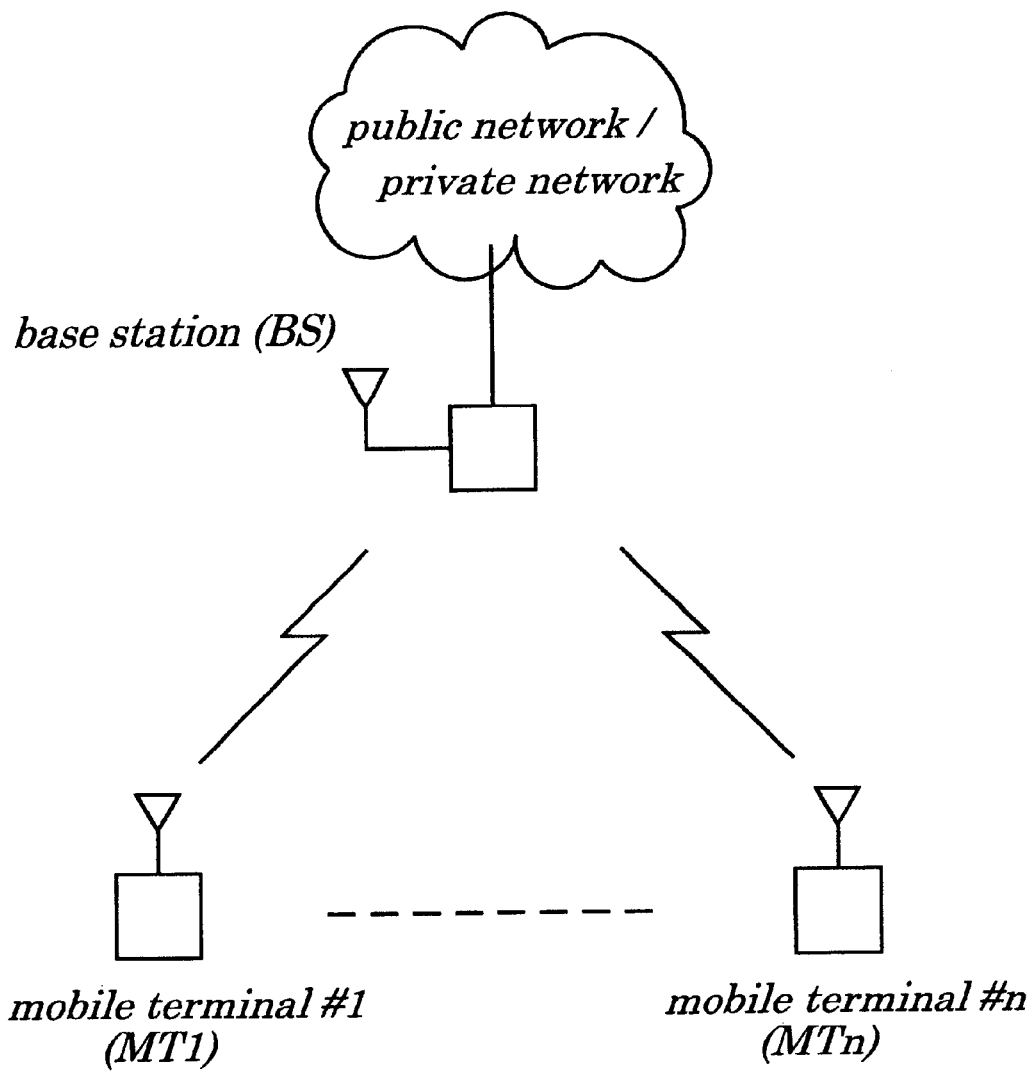
Figure 10:
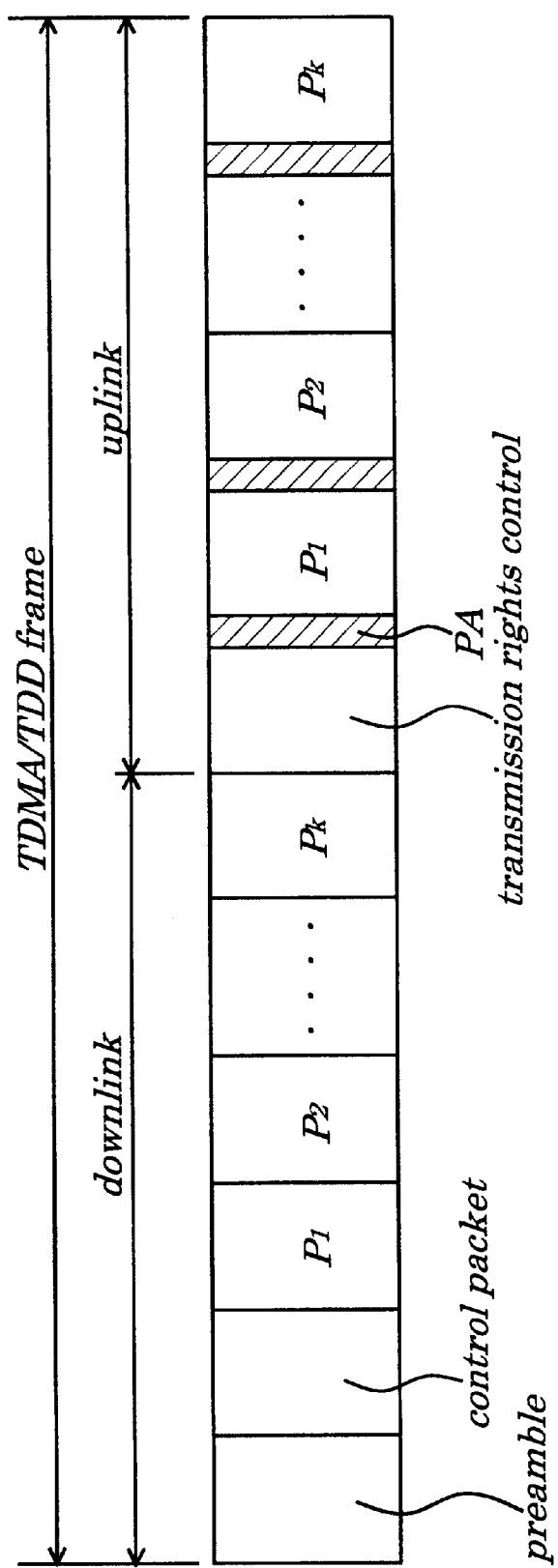
Figure 11:
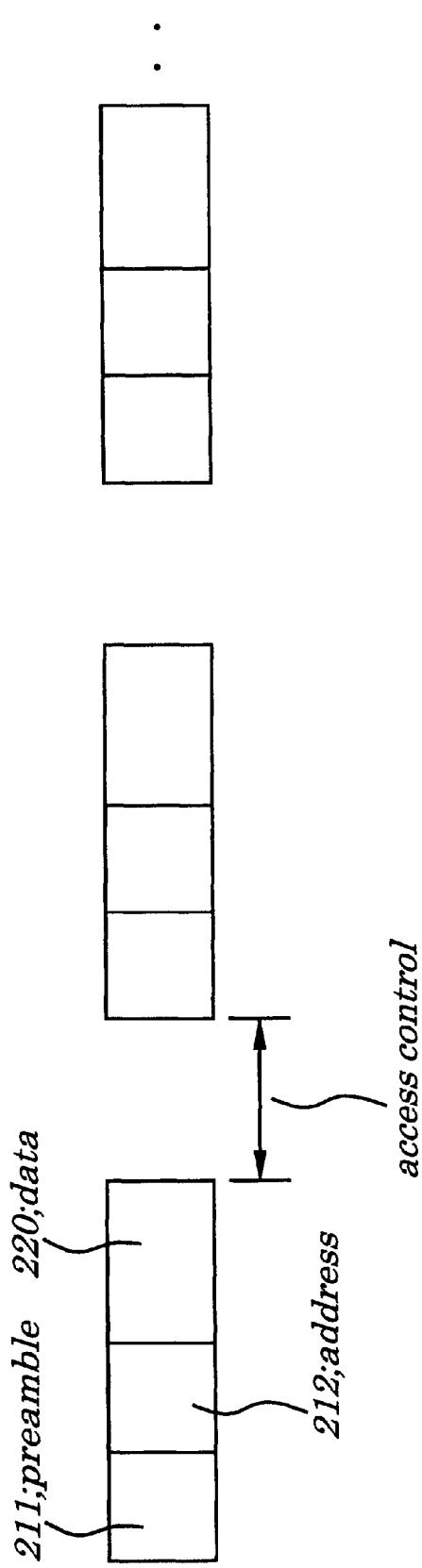

demodulator, high-speed demodulator and frequency converter according to the present invention;

FIG. 6 is a schematic view showing a frame format of a terminal according to the present invention;

FIG. 7 is a schematic diagram showing a format of a low-speed packet;

FIG. 8 is a schematic block diagram of a decision feedback equalizer (DFE) as an example of an equalizer;

FIG. 9 is a schematic view showing a system in which a wireless terminal accesses to a wired LAN or public phone network via a base station;

FIG. 10 is a schematic view showing a TDMA/TDD system;

FIG. 11 is a schematic view showing a corresponding distributed system.

Figure 12:
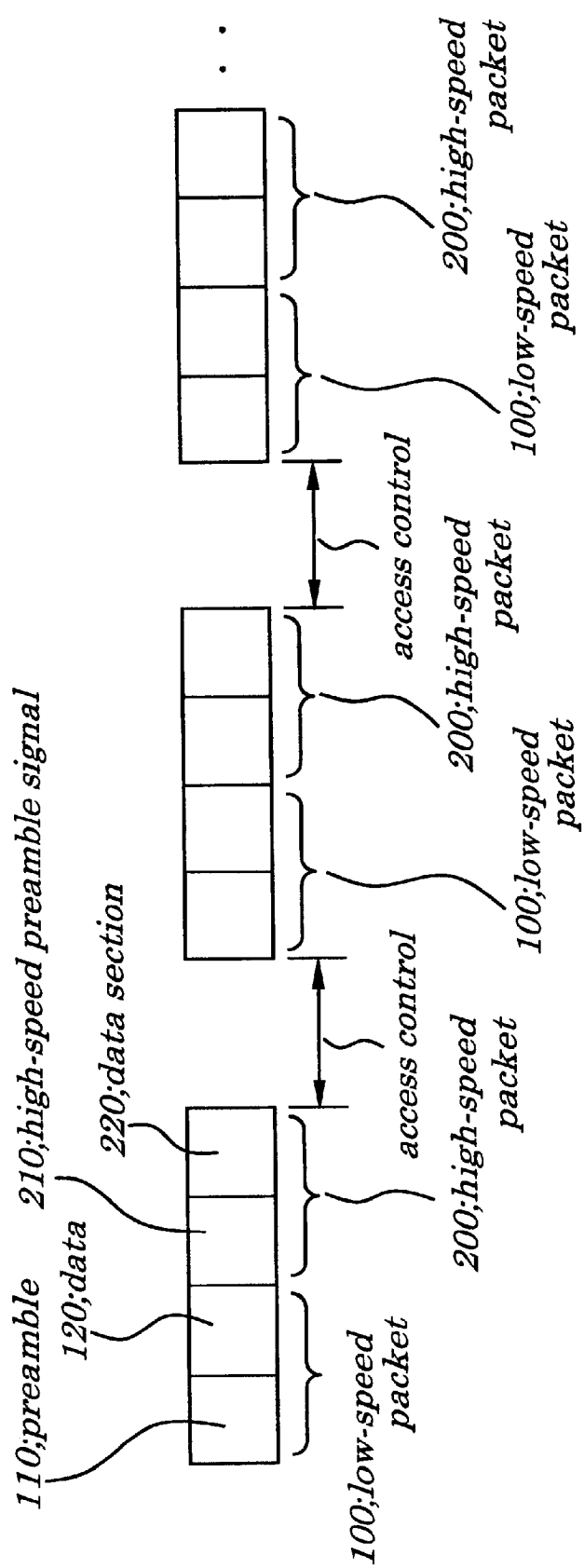
Figure 13:
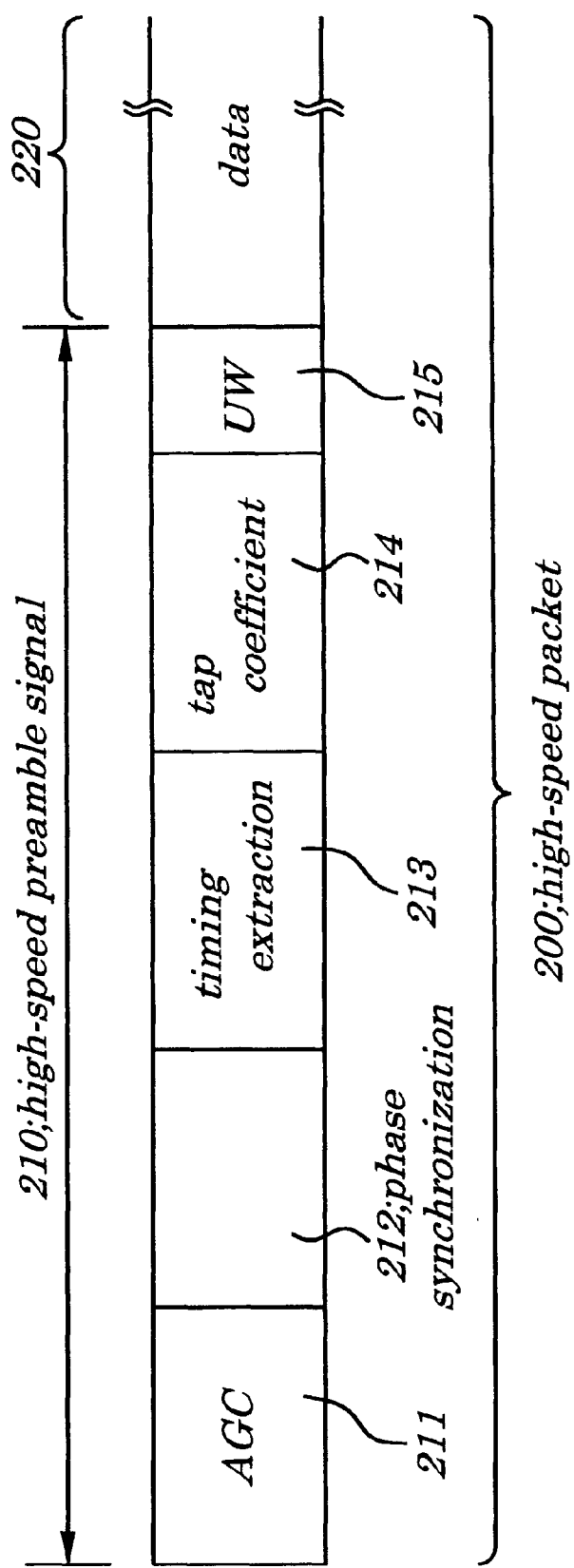
Figure 14:
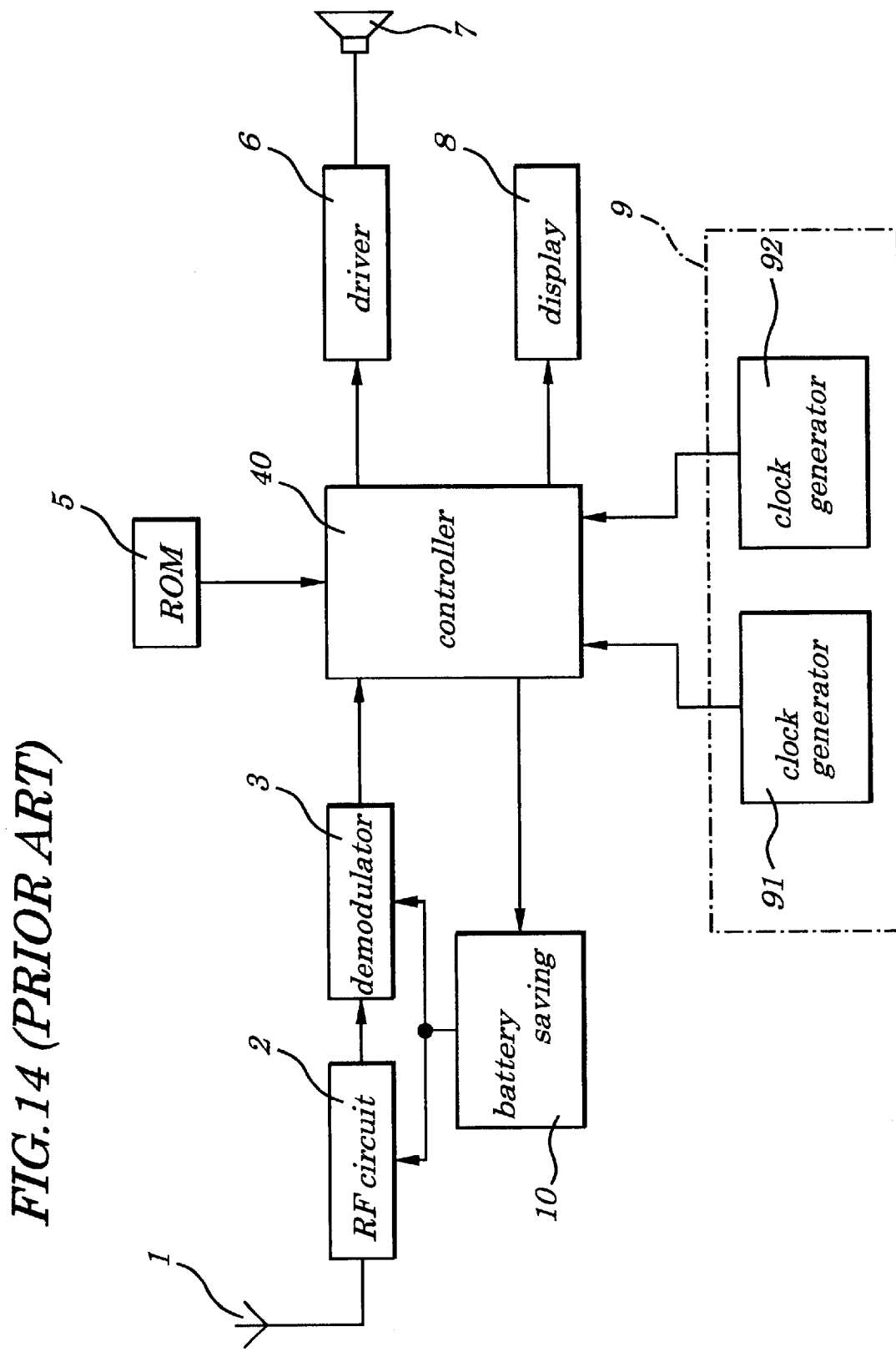
Figure 15:
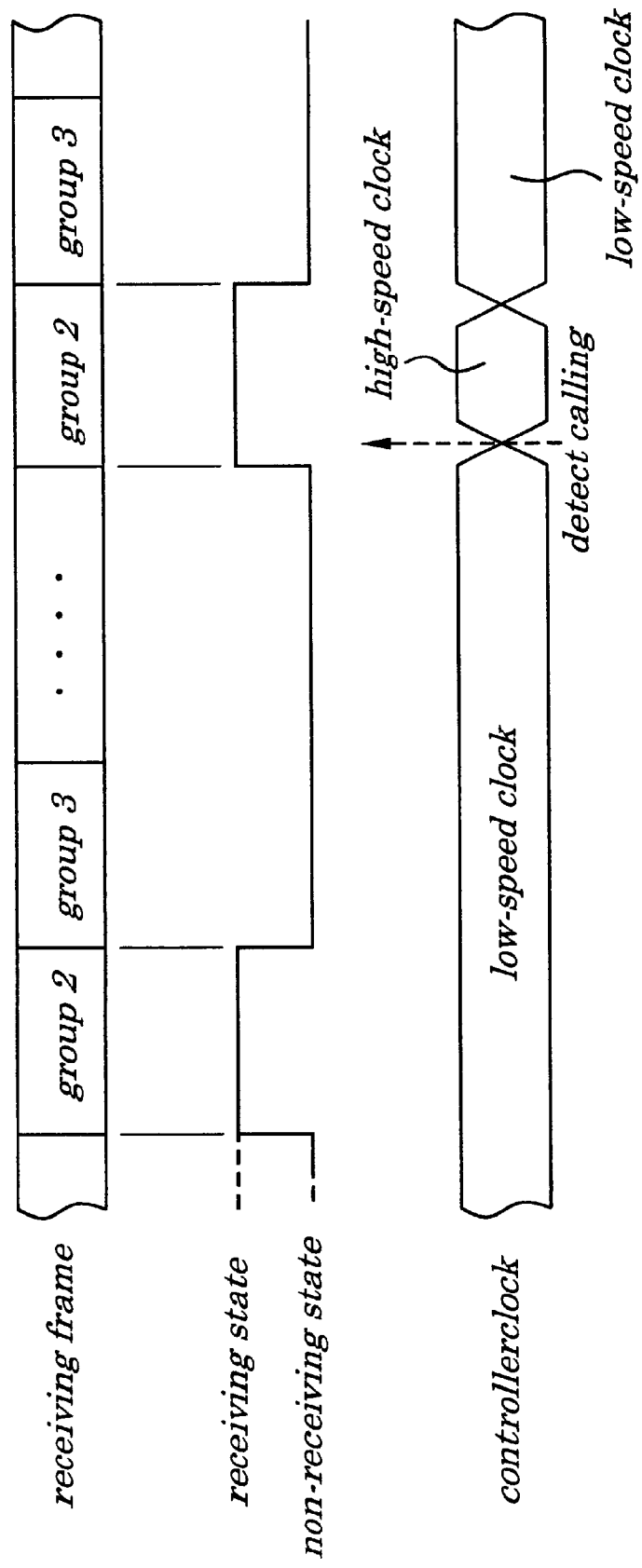
Figure 16:
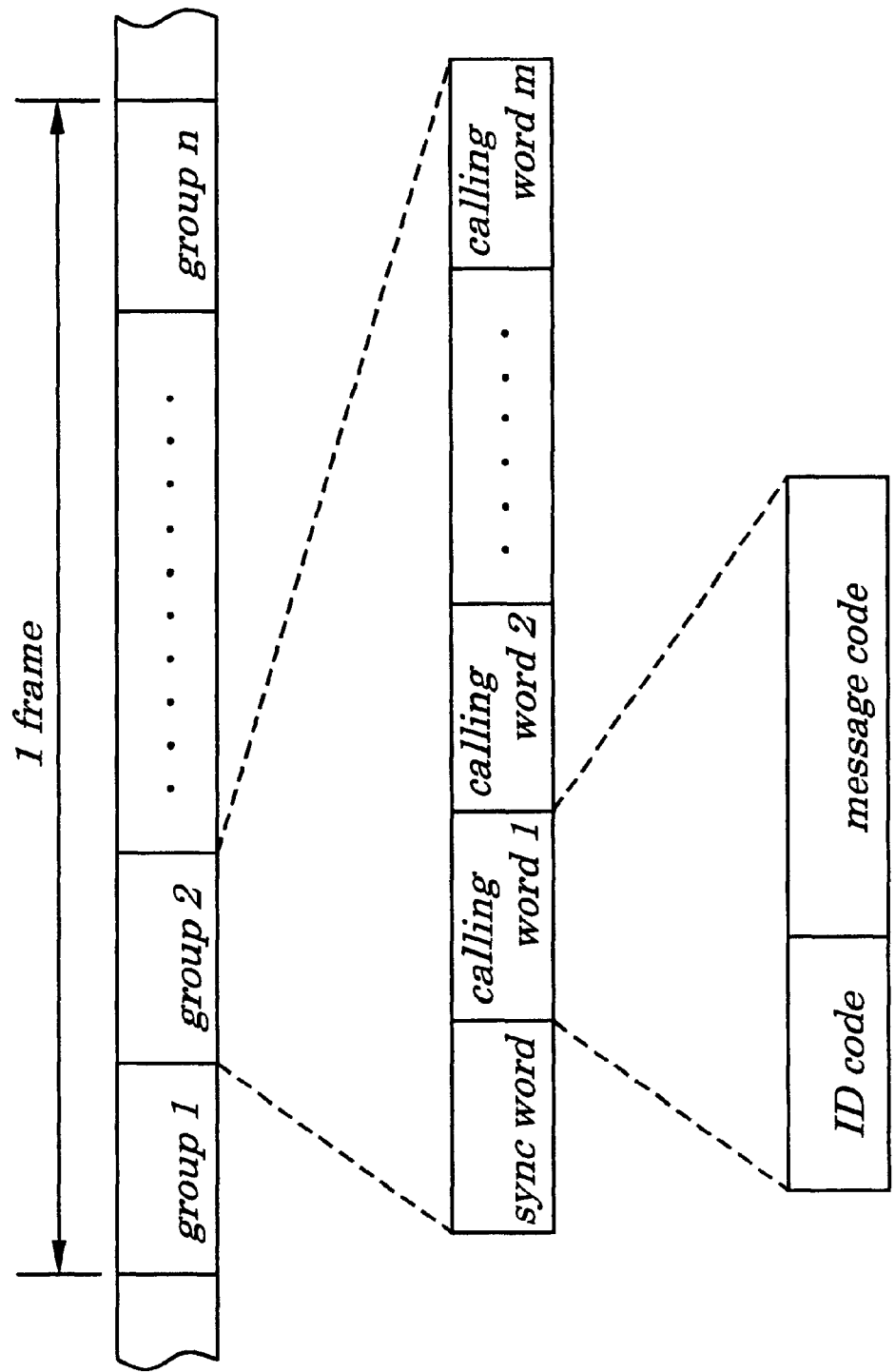
Figure 17:
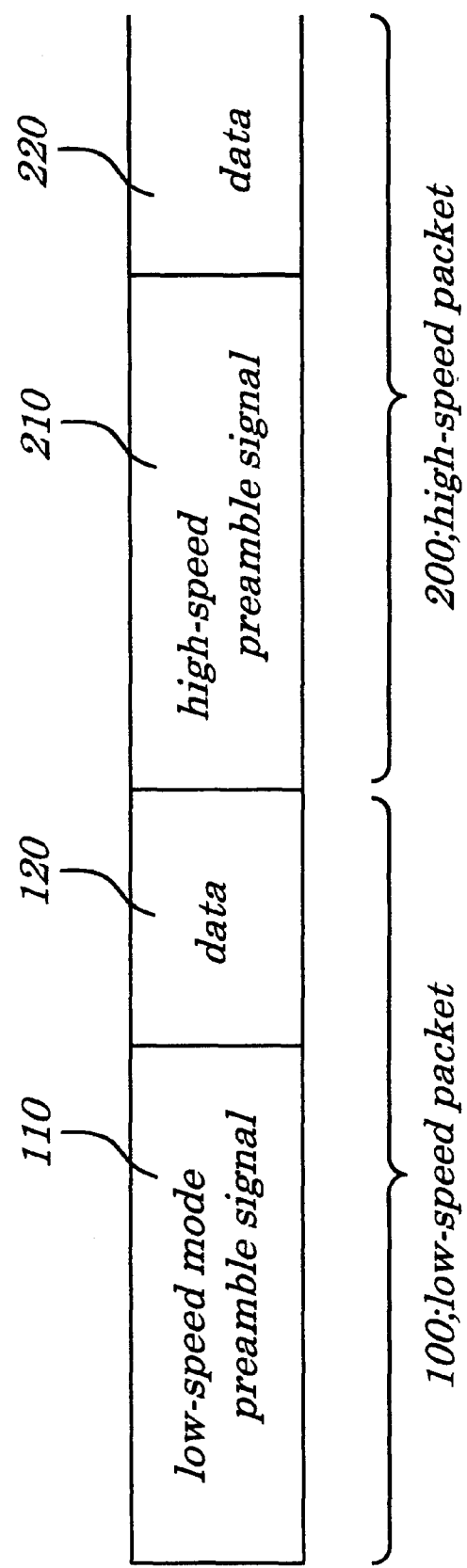

FIG. 12 is a schematic view showing a corresponding distributed access system operating in 2.4 GHz frequency band;

FIG. 13 is a schematic diagram showing a format of a preamble using an equalizer;

FIG. 14 is a schematic block diagram of a receiver according to Japanese Patent Laid-Open Publication No. Hei 2-5633;

FIG. 15 is a schematic view showing a frame format according to Japanese Patent Laid-Open Publication No. Hei 2-5633;

FIG. 16 is a schematic view showing a frame format according to Japanese Patent Laid-Open Publication No. Hei 2-5633; and FIG. 17 is a schematic view showing a frame format;

DETAILED DESCRIPTION OF THE PREFERRED EMBODIMENTS

The present invention will be now described hereinafter with reference to the drawings attached hereto. Firstly, the structures and frame formats of each element of the present invention will be described.

Figure 1:
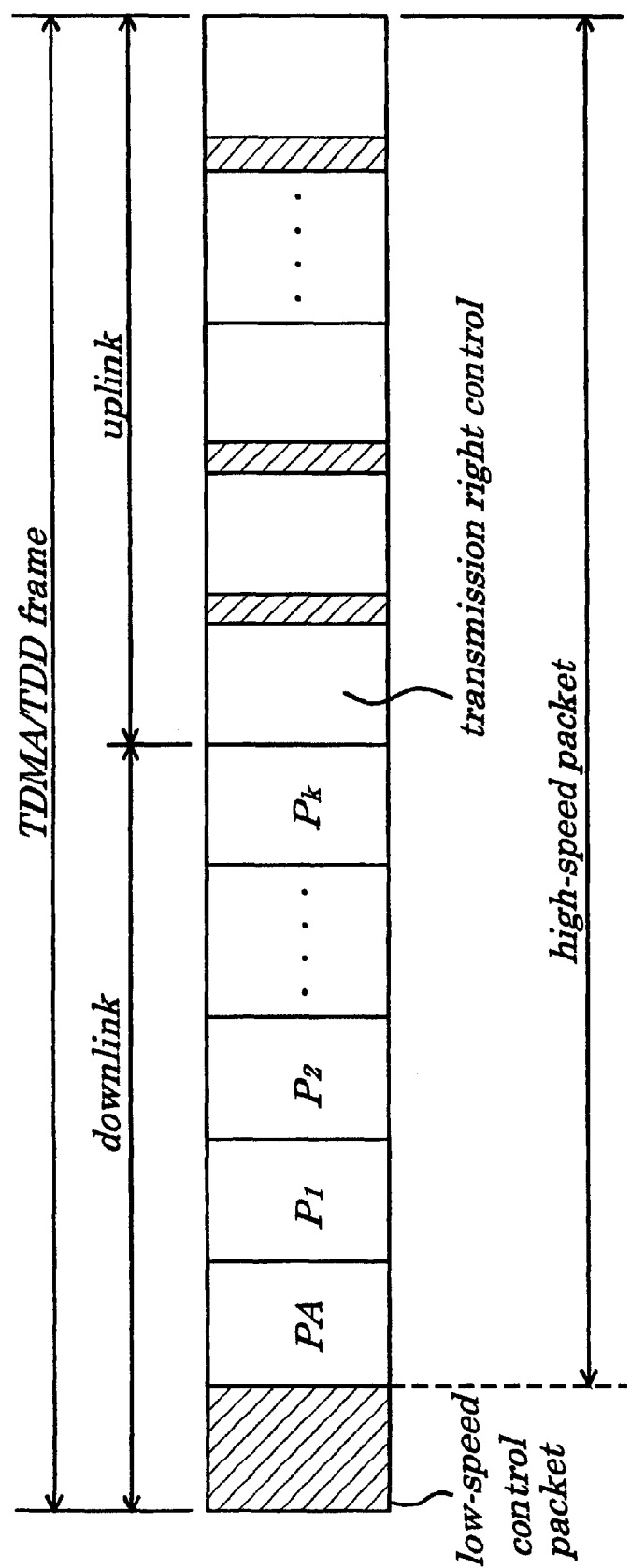
FIG. 1 is a schematic diagram showing a frame format of a TDMA/TDD system to which a wireless modem according to the present invention is applied.

FIG. 1 shows an exemplary frame format in which a wireless modem according to the present invention is applied to a TDMA/TDD system. As can be seen in FIG. 1, a low-speed control packet is applied to the beginning of a TDMA/TDD frame.

Figure 2:
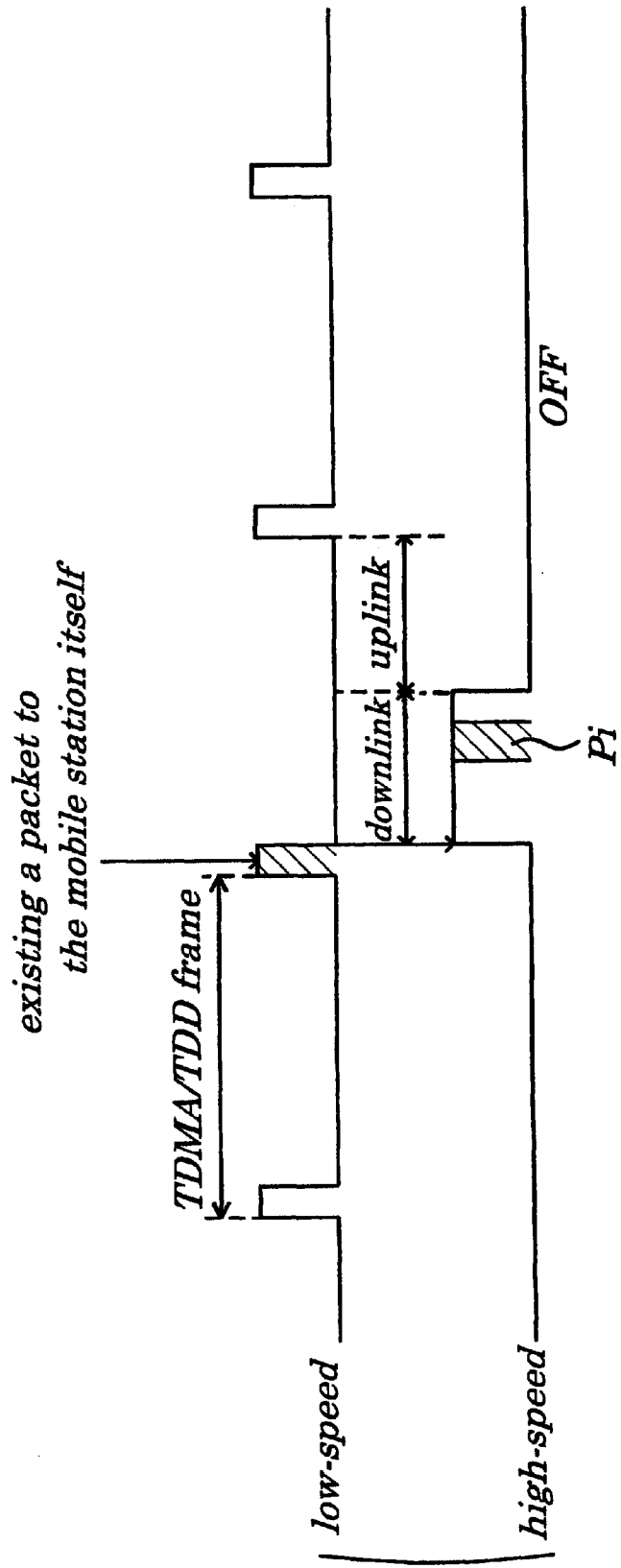
FIG. 2 is time charts of a mobile terminal in high-speed and low-speed modes.

FIG. 2 shows time charts of a mobile terminal in both high-speed and low-speed modes.

Figure 3:
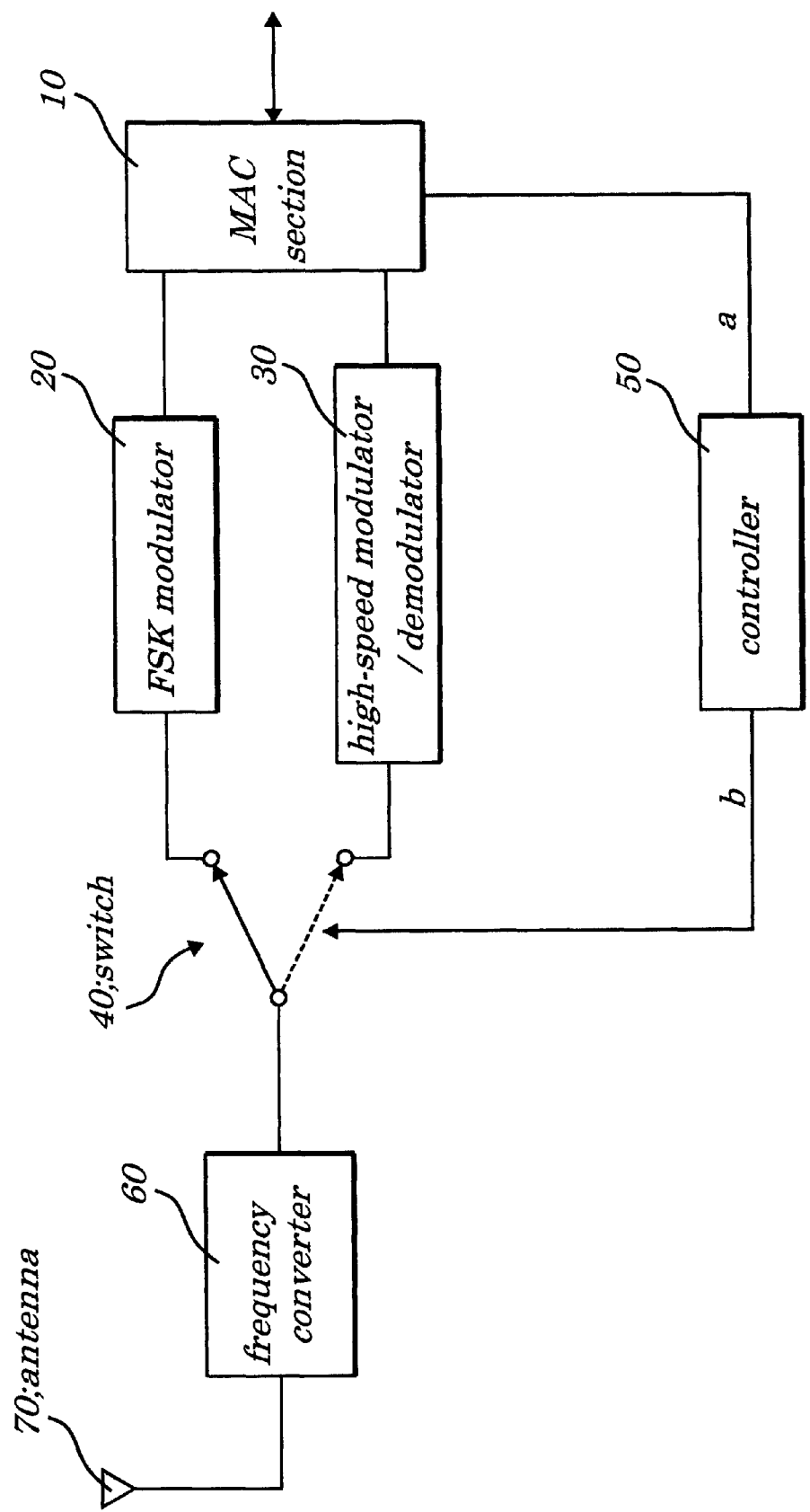
FIG. 3 is a schematic block diagram of a structure of a wireless modem for a base station according to the present invention.

FIG. 3 shows a schematic block diagram of a structure of a wireless modem for a base station according to the present invention, comprising MAC (Media access Control) section 10, FSK modulator 20, high-speed modulator/demodulator 30, switch 40, controller 50, frequency converter 60 and antenna 70.

Figure 4:
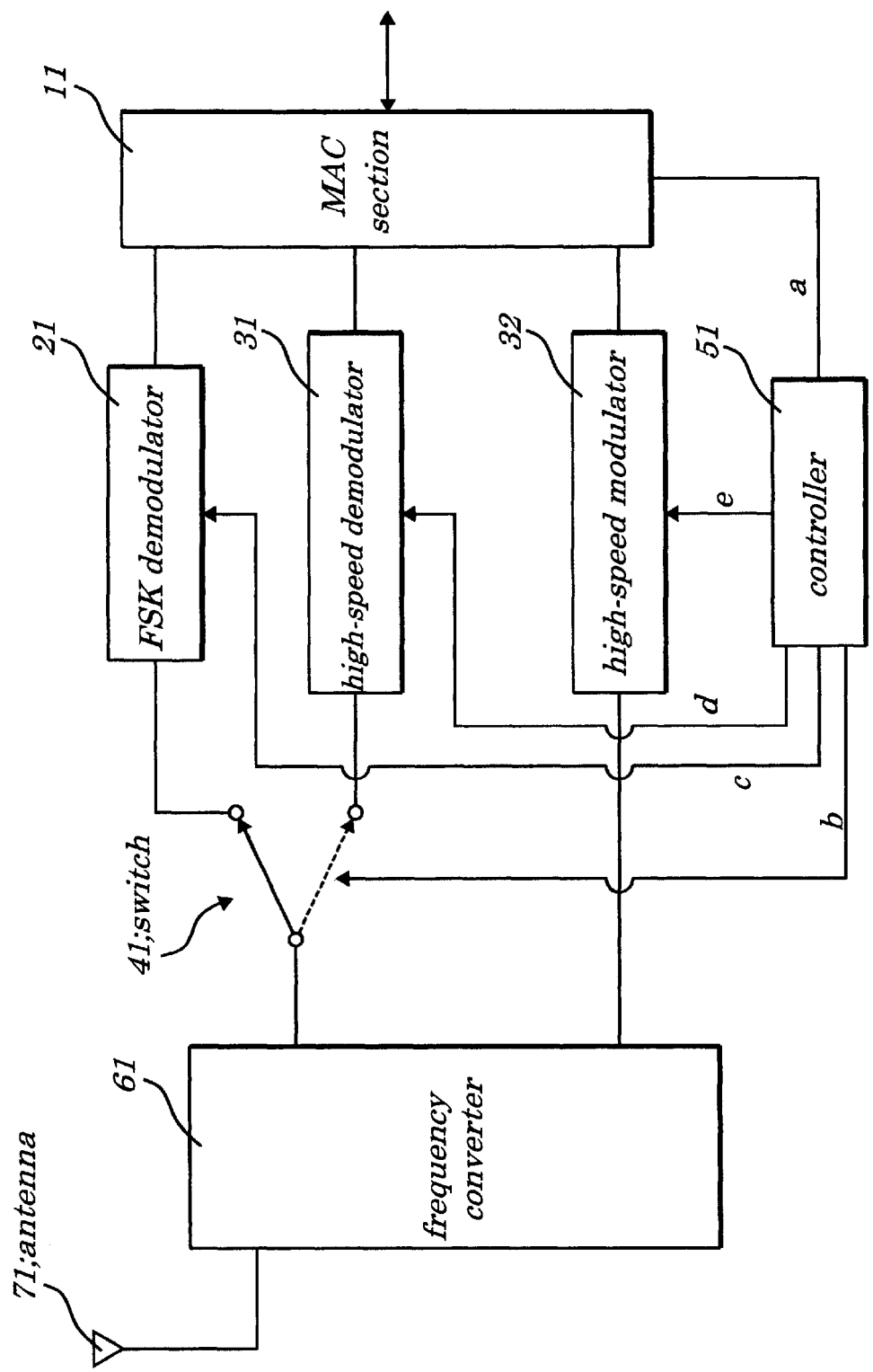
FIG. 4 is a schematic block diagram of a structure of a wireless modem for a mobile terminal according to the present invention.

FIG. 4 shows a schematic block diagram of a structure of a wireless modem for a mobile terminal according to the present invention.

As can be seen in FIG. 4, the wireless modem for a mobile terminal comprises a MAC section 11, frequency shift key (FSK) demodulator 21, high-speed modulator 32, switch 41 for switching between FSK demodulator 21 and high-speed demodulator 31, controller 51, frequency converter 61 and antenna 71.

Figure 5:
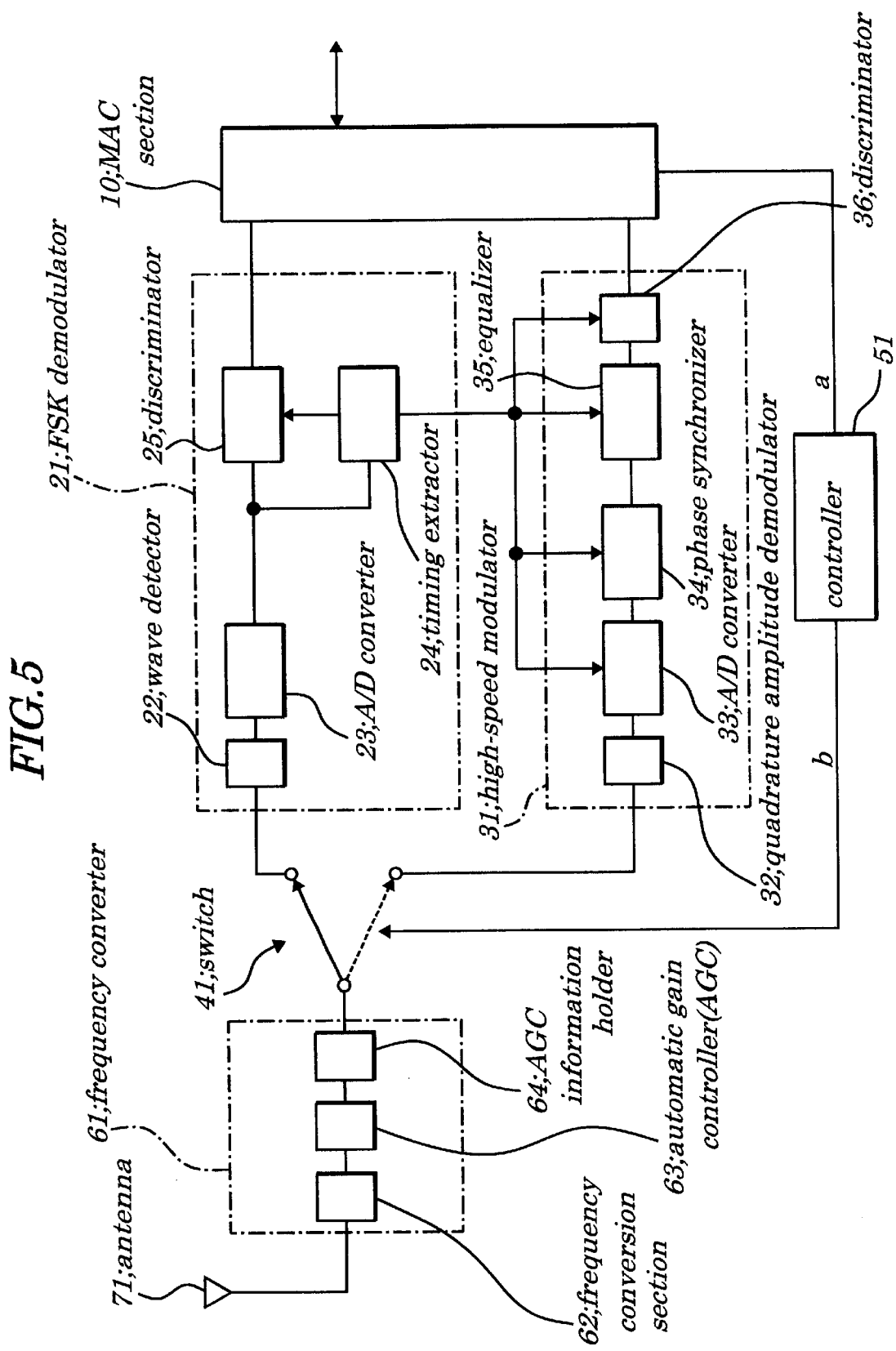
FIG. 5 is a schematic block diagram of a wireless modem for a mobile terminal including a frequency shift key (FSK)

FIG. 5 is a schematic block diagram of the wireless modem for a mobile terminal including a FSK demodulator 21, high-speed demodulator 31 and frequency converter 61.

As can be seen in FIG. 5, the FSK demodulator 21 comprises a wave detector 22, A/D converter 23, timing extractor 24 and discriminator 25. Similarly, the high-speed demodulator 31 comprises a quadrature amplitude demodulator 32, A/D converter 33, phase synchronizer 34, equalizer 35 and discriminator 36. Further, the frequency converter 61 comprises a frequency conversion section 62, automatic gain controller (AGC) 63 and AGC information holder 64.

FIG. 6 is a schematic diagram showing a frame format of a terminal according to the present invention.

As is seen in FIG. 6, according to the frame format of the terminal, the low-speed packet 100 of the frame format of the terminal comprises a preamble 110 and data 120. The preamble 110 comprises an AGC 111, timing extraction 112 and unique word (UW) 113. The format of the low-speed packet is also illustrated in FIG. 7, in which the data 120 of the low-speed packet comprise packets 121, 122, and so forth (P1, P2, ..., Pk). Each of the packets 121, 122, etc. includes the respective ID number in order to identify the terminal.

Now referring again to FIG. 6, a high-speed packet 400 of a frame format of a terminal comprises a preamble 410 and data 420. The preamble 410 comprises phase synchronization 411, tap coefficient 412 and UW 413.

The reduction of power consumption during the stand-by mode according to the present invention will now be described below in greater detail.

At a base station, the MAC section 10 adds a low-speed packet 100 to the beginning of a TDMA/TDD frame, as illustrated in FIG. 7, for input into the FSK modulator 20. The ID numbers included in the data 120 of a low-speed packet 100 (namely, packets 121, 122, etc.) is served to inform to which mobile terminal the base station should transmit the packet in the TDMA/TDD frame immediately after the low-speed packet 100. A low-speed packet 100 is transmitted through the FSK modulator 20, switch 40, frequency converter 60 and eventually antenna 70. After transmission of a low-speed packet 100, the MAC section 10 enters data into the controller 50 in order to switch from the low-speed mode to the high-speed mode, thereby the data for the high-speed mode are entered in the high-speed modulator/demodulator 30. The data in the high-speed mode are transmitted through the high-speed modulator/demodulator 30, the switch 40, the frequency converter 60 and eventually the antenna 70.

When downlink frame transmission is completed, the MAC section 10 of a base station generates a signal and send it into the controller 50 to switch the high-speed modulator/demodulator 30 from the modulator mode to the demodulator mode. A packet from a networked mobile terminal may be received. After completion of the uplink frame operation, the MAC section 10 generates a signal and send it to the controller 50 to switch from the high-speed modulator/demodulator 30, currently operating as the demodulator, to the FSK demodulator 20, thus another one cycle immediately after the present cycle is started.

In regard to mobile terminals in stand-by mode, as shown in FIG. 4, the high-speed modulator 32 and high-speed demodulator 31 are both turned off by control signals d and e from the controller 51. Although the FSK demodulator 21 operating as an assistance to receiving low-speedpackets 100 from a base station may always be turned on, according to the present invention, the FSK demodulator 21 may be turned off during unwanted period of time, in order to reduce the power consumption. That is, the FSK demodulator 21 is turned on immediately before a base station transmits a low-speed packet 100, thus the low-speed packet 100 from the base station is received by a mobile terminal. Then the FSK demodulator 21 is turned off again after receiving a low-speed packet 100 from a base station. This ON/OFF switching operation of the FSK demodulator 21 is possible since the MAC section 11 of a mobile terminal can recognize the timing of a low-speed packet 100 from a base station after the MAC section 11 of the mobile terminal is synchronized with the MAC section 10 of the base station. In particular, a base station notifies the timing of turning the FSK demodulator 21 on to the controller 51 immediately before the transmission of a low-speed packet 100, thus the controller 51 generates a timing signal and send it to the MAC section 11, so that the MAC section 11 can periodically turn on and turn off the FSK demodulator 21. The FSK demodulator 21 performs AGC and bit synchronization by means of the preamble 110 (FIG. 6), then demodulated data are transferred to the MAC section 11. The MAC section 11 in turn determines whether or not the ID number of a mobile terminal is included in the data from the FSK demodulator 21. If not included, the MAC section 11 sends a control signal to the controller 51 to turn off the FSK demodulator 21. To the contrary, if the MAC section 11 recognizes that the its own ID number is included, the MAC section 11 sends a switching signal to the controller 51 so that the switch 40 of a base station may switch from the low-speed mode to high-speed mode. Upon reception of this switching signal, the controller 50 of the base station turns on the high-speed modulator/demodulator 30. The high-speed modulator/demodulator 30 performs phase synchronization by means of a preamble 410 of a high-speed packet 400, thereby the equalizer 35 of a mobile terminal is trained, thus allowing demodulated high-speed data to be sent to the MAC section 11 of the mobile terminal. After the MAC section 11 completes receiving the packet addressed to the mobile terminal itself, the MAC section 11 sends a control signal to the controller 51 so that the high-speed modulator/demodulator 30 of the base station is turned off.

As described above, according to the present invention, a high-speed demodulator including the equalizer is turned ON only when a mobile terminal recognizes that there is a packet addressed to the mobile terminal itself, thus power consumption during the stand-by mode may be decreased.

The prevention of lowered throughput according to the present invention will now be described.

The AGC 63 of FIG. 5 is set by receiving the AGC section111 (for setting the AGC) of the low-speed preamble 110. After the setting of AGC 63, an FSK modulation signal is detected by the wave detector 21, and A/D conversion is then performed thereto by the A/D converter 22. The timing extractor 24 extracts the timing from the timing extraction 112 of a low-speed packet 100, for which the A/D conversion has been performed. Then the discriminator 25 discriminates the unique word (UW) 113 and data 120 thereafter according to the extracted timing to restore the data transmitted from a base station. Then the AGC information holder 64 holds the setting value of AGC 63.

After that, a switch 41 is operated by a signal b from the controller 51 (FIG. 5) to switch from FSK demodulator 21 to high-speed demodulator 31. When the high-speed mode demodulator 31 is switched so as to be connected to the frequency converter 61, according to the present invention, the output from the AGC information holder 64 which has been set in a low-speed packet 100 is used without any modification. Accordingly, a high-speed preamble for AGC, which should basically be provided, can be deleted. In the structure as illustrated in FIG. 5, a level for the receiving signal of a high-speed packet 400 is set according to the gain held in the AGC information holder 64. The receiving signal of the high-speed packet 400 is then converted to digital signals by A/D converter 33 via a quadrature amplitude demodulator 32, and phase synchronization of the receiving signal of the high-speed mode packet 400 necessary for equalization by the phase synchronizer 34 is eventually performed. Further, according to the present invention, although the period of time of preamble for timing extraction should basically be provided, such period of time of preamble for this timing extraction is deleted by using the timing which has been extracted by the timing extractor 24 in a low-speed packet 100. Thus the quadrature amplitude demodulator 32, A/D converter 33, phase synchronizer 34, equalizer 35 and discriminator 36 are operated according to the timing of the timing extractor 24. The equalizer 35 performs initialization by a preamble for setting the tap coefficient, to equalize data and UW following thereafter. The equalized receiving signal is then restored to the transmitted original data by the discriminator 36.

The transmission speed of a low-speed packet by FSK modulation should be selected such that the predetermined quality of a network can be obtained without using an equalizer under multipath fading conditions. For example, in cases where the delay spread, which indicates the spreading state of multipath, is about 20 ns maximum, the transmission speed should be the range of 0.5 to 2 Mbps (preferably about 1 Mbps). Further, in order not to deteriorate timing extraction due to multipath fading conditions, the sampling rate used by the timing extractor 24 should not be the lower-speed bit rate, but rather a rate about the range of 4 to 16 times higher than the lower-speed bit rate, thereby the precise timing extraction which is required for equalization may be secured.

As described above, the preamble for a high-speed packet 400 no longer requires AGC or period of time for timing extraction. Accordingly, as compared with the addition of a simple low-speed function, more effective data transmission throughput can be obtained.

Further, since timing extraction in a low-speed packet 100 is also used in a high-speed packet 400, if a DFE such as that illustrated in FIG. 8 is used to serve as an equalizer, it is sufficient to operate a feed-forward filter at a symbol rate. Therefore, the size of the circuit of the equalizer can be decreased and the power consumption reduced at the same time.

As described above, according to the present invention, a low-speed mode packet is added to the beginning of high-speed mode packets, and AGC as well as timing information which have been set in the low-speed packet are used without any modification in the high-speed packets, thus power consumption during stand-by mode is reduced, the less effective throughput of the data transmission is prevented, and minimum scale and minimum power consumption of the equalizer are achieved.

Although there has been described above in its preferred form with a certain degree of particularity, it will be appreciated by those skilled in the art that the present invention is not intended to be limited to the embodiments as described above.

It is thus apparent that the present invention should by no means be limited to the illustrated embodiment and various modification and changes may be suggested without departing from the scope and spirit of the invention.

Finally, the present application claims the priority of Japanese Patent Application No.Hei 9-164146 filed on Jun. 20, 1997, which is herein incorporated by reference.

What is claimed is:

1. A high-speed wireless access device comprising:
a first wireless modem in a base station and a second wireless modem in a mobile terminal,
wherein said first wireless modem in a base station includes,
  a low-speed modulation means;
  a first high-speed modulation/demodulation means with a first equalizer built-in;
  a low-speed packet adding means for adding a low-speed packet by said low-speed modulation means to the-beginning of a high-speed packet;
  an information adding means for adding information to said low-speed packet in order to inform a terminal to which terminal a packet is transmitted; and
  a transmission means for transmitting a packet addressed to a mobile terminal by switching to a high-speed mode immediately after adding said low-speed packet,
and said second wireless modem in a mobile terminal includes,
  a low-speed demodulation means;
  a second high-speed modulation/demodulation means with a second equalizer built-in;
  a switching means for switching from said low-speed demodulation means to said second high-speed modulation/demodulation means and vice-versa;
  an analyzing means for analyzing data received by said low-speed demodulation means;
  a means for turning off said low-speed demodulation means and for turning on said second high-speed modulation/demodulation means when a packet addressed to said mobile terminal is recognized;
  a means for turning off said second high-speed modulation/demodulation means after receiving said packet addressed to said mobile terminal;
  an AGC information holding means for holding AGC information in a low-speed receiving mode and for making use of said AGC information in a high-speed receiving mode; and
  a timing extraction information holding means for holding timing extraction information in said low-speed receiving mode and for making use of said timing information in said high-speed receiving mode.

2. A high-speed wireless access device according to claim 1, wherein a transmission speed of said low-speed receiving mode is the range of 0.5 to 2 Mbps in conditions in which delay spread, which indicates a spreading state of multipath, is about 200 ns maximum.

3. A high-speed wireless access device according to claim 1, wherein said timing extraction information holding means further comprises a timing extraction means.

4. A high-speed wireless access device according to claim 3, wherein said timing extraction means uses a sampling rate which is the range of 4 to 16 times higher than the low-speed bit rate.

5. A high-speed wireless access device according to claim 3, wherein at least one of said first and second equalizer is a decision feedback equalizer.

6. A wireless modem of a base station comprising:
  a low-speed modulation means;
  a high-speed modulation/demodulation means with an equalizer built-in;
  a low-speed packet adding means for adding a low-speed packet by said low-speed modulation means to the beginning of a high-speed packet;
  an information adding means for adding information to said low-speed packet in order to inform a terminal to which terminal a packet is transmitted; and
  a transmission means for transmitting a packet addressed to a mobile terminal by switching to a high-speed mode immediately after adding said low-speed packet.

7. A wireless modem of a base station according to claim 6, wherein said equalizer which is built in said high-speed modulation/demodulation means is a decision feedback equalizer.

8. A wireless modem of a mobile terminal including:
  a low-speed demodulation means;
  a high-speed modulation/demodulation means with an equalizer built-in;
  a switching means for switching from said low-speed demodulation means to said high-speed modulation/demodulation means and vice-versa;
  an analyzing means for analyzing data received by said low-speed demodulation means;
  a means for turning off said low-speed demodulation means and for turning on said high-speed modulation/demodulation means when a packet addressed to said mobile terminal is recognized;
  a means for turning off said high-speed modulation/demodulation means after receiving said packet addressed to said mobile terminal;
  an AGC information holding means for holding AGC information in a low-speed receiving mode and for making use of said AGC information in a high-speed receiving mode; and
  a timing extraction information holding means for holding timing extraction information in said low-speed receiving mode and for making use of said timing information in said high-speed receiving mode.

9. A wireless modem of a mobile terminal according to claim 8, wherein said equalizer which is built in said high-speed modulation/demodulation is a decision feedback equalizer.

10. A wireless modem of a mobile terminal according to claim 8, wherein said timing extraction information holding means further comprises a timing extraction means.

11. A wireless modem of a mobile terminal according to claim 10, wherein said timing extraction means uses a sampling rate which is the range of 4 to 16 than the low-speed bit rate.

* * * * *